March 17, 1959 G. A. M. PETERSEN 2,877,987
CONVERSION HEAD
Filed Nov. 13, 1956 2 Sheets-Sheet 1
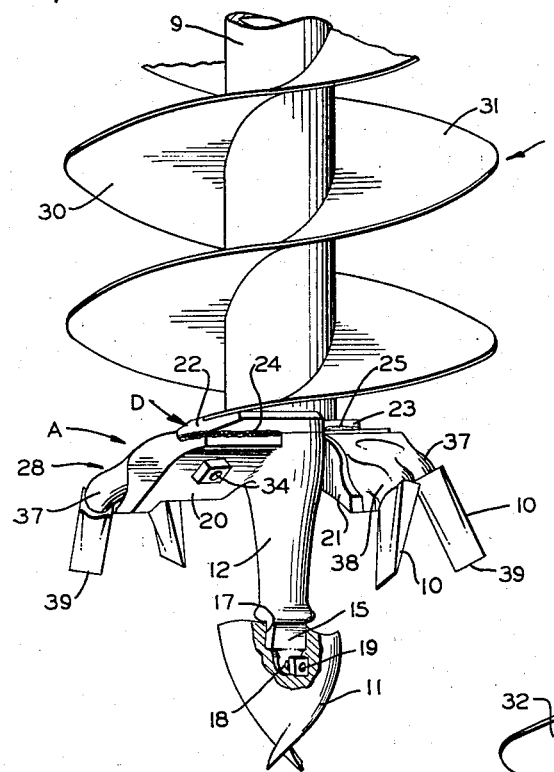
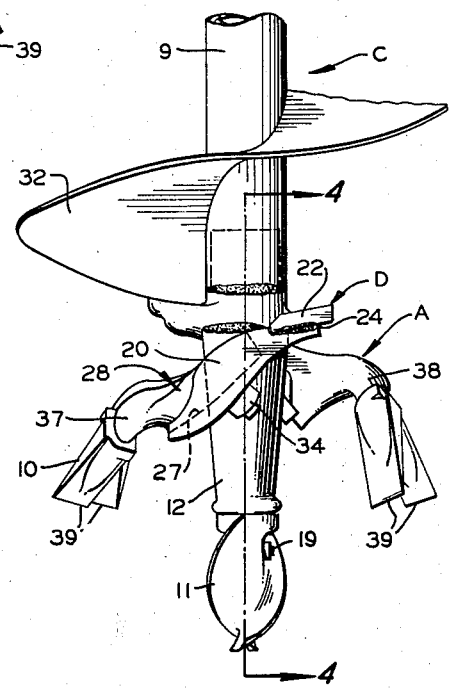
INVENTOR.
GERALD A. M. PETERSEN
BY
Hansen and Laue
ATTORNEYS March 17, 1959 — G. A. M. PETERSEN — 2,877,987
CONVERSION HEAD
Filed Nov. 13, 1956 — 2 Sheets-Sheet 2
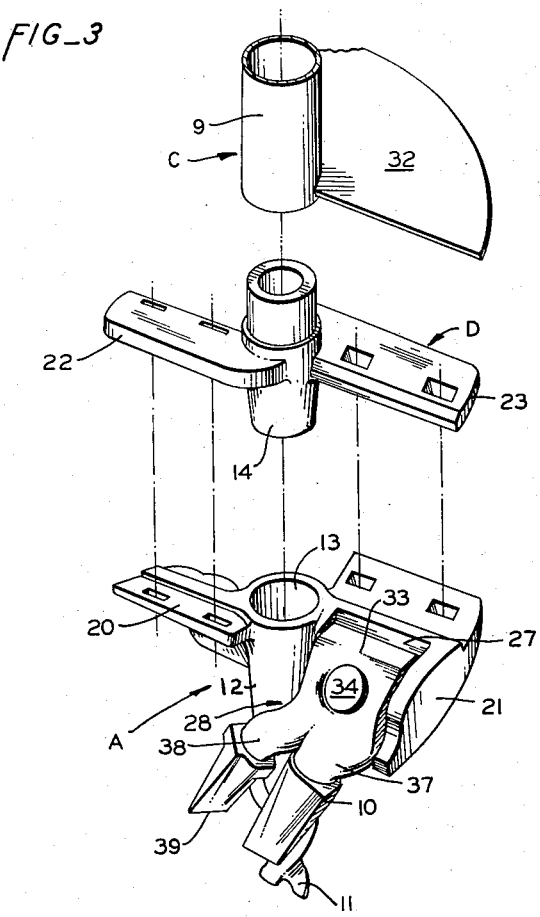
FIG_3
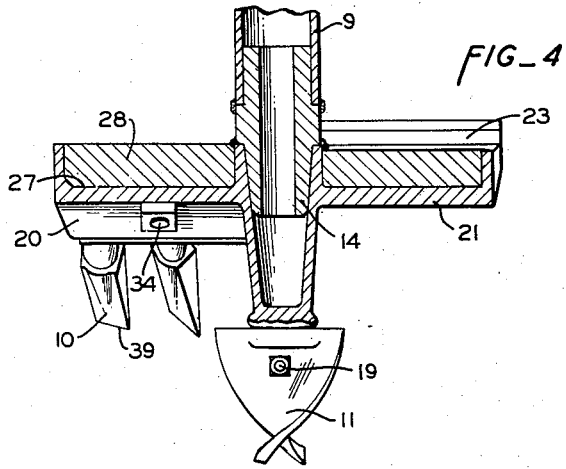
FIG_4
INVENTOR.
GERALD A. M. PETERSEN
BY
ATTORNEYS

United States Patent Office 2,877,987
Patented Mar. 17, 1959

2,877,987

CONVERSION HEAD

Gerald A. M. Petersen, Santa Clara, Calif.

Application November 13, 1956, Serial No. 621,595

2 Claims. (Cl. 255—69)

The present invention relates to earth boring augers, and pertains more particularly to a conversion head for such augers.

It is customary to make earth boring augers with either one or two helical fins formed coaxially about a shaft portion, so that the fins will elevate out of the hole dirt freed by the cutting action of the auger.

Regardless of whether an auger of this type is provided with a single or a double helical fin, it is customary to provide two radially extending rows of cutting teeth on its lower end, said teeth being mounted on opposite sides of its axis of rotation so as to balance the torque stresses about the cutting axis. Where a double helical fin is provided, the cutting teeth normally are mounted along the lower terminal edges of the two helical fins, and where a single fin only is provided, it is customary to mount one row of cutting teeth along the terminal edge of the single fin, and to mount a second row of teeth along a member extending diametrically oppositely to the terminal edge of the single fin.

On many earth boring augers now in use, a terminal fitting is provided on the lower end of the auger along the terminal edges of the fins to reinforce the fins and to provide means for supporting the cutting teeth and pilot bit which conventionally are employed on such augers.

While many users of these existing augers would like to use new style socketed cutting teeth such as those disclosed in my patent application Serial No. 501,804, filed April 18, 1955, and new style pilot bits such as those disclosed in my patent application Serial No. 414,007, now Patent No. 2,773,673, dated December 11, 1956, and filed March 4, 1954, they are unable to do so because such new teeth and pilot bits will not fit onto their present augers. In order to remodel such existing augers to take the new teeth and pilot bits, it is necessary to replace the existing terminal fitting on such augers with a new one, and such replacement usually requires the use of a jig or fixture to insure proper alignment of the new terminal fitting. This requires that the auger be removed from the boring machine and transferred to a shop or factory, and is so expensive and time consuming that most operators of such existing equipment are required to forego making the change.

The present invention contemplates the provision of a self-aligning, easily mounted conversion head for mounting on an existing earth boring auger without removing the auger from a boring machine on which the auger is mounted, so as to permit the use on such auger of a different type of cutting teeth and pilot bit.

The invention also provides an improved conversion head for field mounting on an existing earth boring auger without removing an existing terminal fitting therefrom so as to reinforce the auger, and to provide for the mounting thereon of an improved type of cutting tooth and pilot bit.

A further object of the invention is to provide an improved conversion head for an earth boring auger.

These and other objects and advantages of the invention will be apparent from the following description and the accompanying drawings, wherein:

Fig. 1 is a side elevational view of an earth boring auger of the double helical fin type having a conversion head embodying the present invention mounted thereon, the upper portion of the auger being broken away.

Fig. 2 is a side elevational view of the conversion head of Fig. 1 as it appears when mounted on a single helical fin auger, the auger and conversion head being rotatively moved from their position in Fig. 1.

Fig. 3 is an exploded view showing the conversion head of the present invention, the terminal fitting, and the auger in axially separated condition, the broken lines showing the longitudinal alignment of various portions.

Fig. 4 is a longitudinal sectional view taken along line 4—4 of Fig. 2.

Briefly, the conversion head A of the present invention is an integral unit for mounting on the lower end of an existing earth boring auger such as a double fin type auger B (Fig. 1) or a single fin type auger C (Fig. 2) having an existing terminal fitting D thereon. Both types of augers are provided with a tubular axial portion 9. Use of the conversion head A converts the auger B or C for use with improved type teeth 10 and an improved pilot bit 11.

Referring to the drawings in detail, the conversion head A preferably is a steel forging with an axial portion 12 thereof of circular cross sectional shape and tapered from its upper toward its lower end. A socket 13 (Fig. 3) is provided in the upper end of the axial portion 12 of a size to receive therein the usual axial pilot bit supporting extension 14 on the lower end of the terminal fitting D of an existing earth boring auger such as the auger B or C.

A transversely flattened, diametrically extending pilot bit mounting portion 15 (Fig. 1) is formed integrally with the lower end of the axial portion 13 of the conversion head A, and fits into a correspondingly shaped socket 17 provided therefor in the upper end of a pilot bit 11 to be mounted thereon. The pilot bit 11 preferably is made in accordance with my co-pending U. S. patent application Serial No. 414,007, now Patent No. 2,773,673, dated December 11, 1956, and filed March 4, 1954. A bolt hole 18 is provided transversely through the flattened extension 15 to receive a mounting bolt 19 inserted through aligned holes provided therefor in the pilot bit 11.

A pair of substantially identical, tooth-supporting, radially extending side portions 20 and 21 are formed integrally on the upper end of the axial portion 12 of the conversion head A. These side portions 20 and 21 are formed to fit closely beneath laterally extending side portions 22 and 23, respectively, of the terminal fitting D of the existing auger to be converted. With the downwardly projecting pilot bit extension 14 of the existing terminal fitting D fitted co-axially into the socket 13 in the upper end of the conversion head A, and the side portions 20 and 21 fitted in conforming relation beneath the side portions 22 and 23 of the terminal fitting D, the conversion head A then will be coaxially aligned with the existing auger and its terminal fitting and may be fixedly secured by welds 24 and 25 to the terminal fitting D (Figs. 1 and 2).

A recessed seat 27 is formed in the upper face of each side portion 20 and 21 of the conversion head A for receiving a tooth support member 28 in fitted relation therein. Each seat 27 is inclined downwardly at an acute angle greater than the pitch angle of the helical fins 30 and 31 of the auger B, or the fin 32 of the auger C, upon which the conversion head is mounted.

Each recessed seat 27 is formed to receive the generally rectangular body portion 33 of the bifurcated tooth support member 28 in fitted relation therein. The tooth support members 28 are secured in position in their respective seats by bolts 34 passing through aligned holes provided therefor in each tooth support 28 and in the radially extending portions 20 and 21 of the conversion head A.

Each tooth support member 28 has a pair of angularly divergent, integrally formed tooth supporting fingers 37 and 38 extending in directions which will incline them downwardly with respect to a continuation of the helical fins 30 and 31 (Fig. 1) or 32 (Fig. 2) as the case may be, of the auger upon which the tooth support member is mounted, as best illustrated in Fig. 2.

Each tooth supporting finger 37 and 38 is of generally oval cross sectional shape, and is formed to receive in closely fitted, non-rotatable relation thereon, a replaceable cutting tooth 10 made in accordance with the invention disclosed in my co-pending patent application, Serial No. 501,804, filed April 18, 1955.

The teeth 10 are fitted onto their respective fingers 37 and 38 with the cutting edges 39 of the teeth disposed at divergent angles to each other. They thus exert a powerful scarifying, cutting action on the earth into which the auger is rotatively advanced during an earth boring operation.

The operation and advantages of the auger with the conversion head A, cutting teeth 10 and pilot bit 11 mounted thereon is substantially the same as when an auger is designed and constructed originally for use with these appurtenances. The present invention thus provides for a simple and easily performed conversion, which can be made in a short time, and at little expense.

In using the invention, any cutting teeth and pilot bit (not shown) with which the existing auger may be provided are removed from the existing terminal fitting D, and the pilot bit mounting portion 14 is inserted into the socket 13 provided therefor in the upper end of the conversion head A, thereby centering the conversion head coaxially on the fitting D. The conversion head A then is rotatively adjusted relative to the terminal fitting D so as to position the side portions 20 and 21 of the conversion head in properly fitted co-axial relation beneath the side portions 22 and 23, respectively, of the terminal fitting D as shown in Figs. 1 and 2. The welds 24 and 25 then are made to permanently and securely attach the conversion head A to the terminal fitting D as a substantially integral and co-axially aligned part of the auger, without the need of jigs or fixtures to secure such alignment.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. A conversion head for field mounting co-axially on an existing earth boring auger having a helical fin thereon and having an existing terminal fitting welded coaxially onto the lower end of such auger, said terminal fitting having an axially disposed lower end portion and having a diametrically extending portion secured co-extensively onto a lower terminal edge portion of the auger fin, a predetermined surface portion of such terminal fitting being formed and disposed in predetermined relation to the helix described by the auger fin; said conversion head comprising a portion formed coaxially of its upper end for co-axial relation with the lower end portion of such existing terminal fitting, a tooth supporting arm of substantially different configuration from the terminal fitting of such auger formed integrally with said axial portion of the conversion head and extending radially therefrom, an upper surface of the tooth supporting arm being formed and disposed to fit in contacting, co-extensive relation beneath an under surface of the diametrically extending portion of such terminal fitting when the conversion head is axially aligned with such fitting, thereby to axially align the conversion head with the terminal fitting for welding thereto.

2. A conversion head for field mounting coaxially on an existing earth boring auger having a helical fin thereon and having an existing terminal fitting welded coaxially onto the lower end of such auger, such terminal fitting having an axially disposed lower end portion and having a diametrically extending portion secured co-extensively onto a lower terminal edge portion of the auger fin, a surface portion of such terminal fitting being formed and disposed in known relation to the helix described by such auger fin; the conversion head comprising an axial portion having means formed coaxially of its upper end for co-axial relation with an axially disposed portion of an existing auger terminal fitting onto which the conversion head is to be mounted, an integral tooth supporting arm of substantially different configuration from the terminal fitting of such auger and extending radially from said axial portion of the conversion head, a surface of said tooth supporting arm being formed for close, interfitted, co-extensive relation with a surface of such terminal fitting when the conversion head is mounted with the axial projection on the lower end of such terminal fitting co-axial with the axial portion of the conversion head, whereby the conversion head is thereby aligned coaxially with such terminal fitting for permanent welding thereto, tooth mounting means on said tooth supporting arm of the conversion head, and pilot bit mounting means located co-axially on the lower end of the axial portion of the conversion head.

References Cited in the file of this patent

UNITED STATES PATENTS

| | | |
|---|---|---|
| 946,060 | Looker | Jan. 11, 1910 |
| 1,789,399 | Bartenbach et al. | Jan. 20, 1931 |
| 2,680,597 | Brown | June 8, 1954 |
| 2,773,673 | Peterson | Dec. 11, 1956 |